United States Patent [19] [11] 3,896,844
Schumacher [45] July 29, 1975

[54] FLUID FLOW REGULATING APPARATUS
[75] Inventor: Werner Schumacher, Asperg, Germany
[73] Assignee: Robert Bosch G.m.b.H., Stuttgart, Germany
[22] Filed: Apr. 1, 1974
[21] Appl. No.: 457,124

[30] Foreign Application Priority Data
Apr. 4, 1973 Germany............................ 2322421

[52] U.S. Cl................................ 137/488; 251/120
[51] Int. Cl............................................. F16k 17/00
[58] Field of Search ..... 137/488, 489, 493.6, 493.9, 137/493.7, 625.25, 85, 226, 589, 587, 485; 251/120, 123, 118; 138/45, 45 A, 625.2, 596, 625.27; 236/92 R

[56] References Cited
UNITED STATES PATENTS
2,637,985 5/1953 Ray................................ 137/488 X
2,737,974 3/1956 Renick............................... 137/489
3,246,669 4/1966 Adams et al..................... 137/489 X
3,326,239 6/1967 Saint-Joanis et al........... 137/625.66

FOREIGN PATENTS OR APPLICATIONS
291,520 6/1928 United Kingdom................. 137/488

Primary Examiner—Martin P. Schwadron
Assistant Examiner—Robert J. Miller
Attorney, Agent, or Firm—Michael S. Striker

[57] ABSTRACT

A fluid flow regulating apparatus wherein the valve member of a master valve controls the flow of fluid from an inlet opening to an outlet opening. The pressure of fluid in one of the openings is maintained within a desired range by an assembly including a pilot valve which is installed in a first channel connecting a plenum chamber of the master valve with the other opening, a first adjustable flow restrictor which is installed in a second channel connecting the one opening with the chamber, and a second flow restrictor between the plenum chamber and the pilot valve. The pilot valve opens when the fluid pressure in the one opening exceeds a preselected value whereby a ball of the second flow restrictor reduces the throttling action of the second flow restrictor at a relatively low rate and increases the throttling action of the first flow restrictor at a higher rate. The fluid in the plenum chamber cooperates with a spring to urge the valve member toward its open or closed position, depending upon whether the one opening is the outlet or inlet opening of the master valve, and the fluid in the one opening opposes such movement of the valve member.

9 Claims, 3 Drawing Figures

FLUID FLOW REGULATING APPARATUS

BACKGROUND OF THE INVENTION

The present invention relates to fluid flow regulating apparatus in general, and more particularly to improvements in apparatus for limiting the fluid pressure in the inlet or outlet opening of a master valve which is controlled by a pilot valve. Still more particularly, the invention relates to improvements in fluid flow regulating apparatus of the type wherein the valve member which regulates the flow of fluid between the inlet and outlet openings of the master valve is biased by resilient means as well as by fluid in a plenum chamber of the master valve against the variable pressure of fluid in the inlet or outlet opening of the master valve.

It is already known to install the pilot valve in a channel which connects the aforementioned plenum chamber with that opening in the body of the master valve wherein the fluid pressure need not be regulated, and to install a flow restrictor in a second channel which connects the other opening with the plenum chamber. The flow restrictor throttles the flow of fluid at a constant rate and is installed in a reciprocable piston which abuts against a conical valve member of the pilot valve. Such construction of the assembly including the pilot valve and the flow restrictor insures a rapid displacement of the valve member in the master valve in one direction (e.g., to open the master valve); however, the movement of the valve member in the opposite direction is slow because the rate of fluid flow through the flow restrictor is constant. This can cause serious problems when the master valve admits pressurized fluid to one or more consumers because the closing of master valve often takes place after the pressure of working fluid drops well below the optimum pressure. Moreover, losses in control fluid are rather high, again due to the fact that the rate of fluid flow through the flow restrictor is constant.

SUMMARY OF THE INVENTION

An object of the invention is to provide a fluid flow regulating apparatus wherein the assembly including the pilot valve insures a rapid opening and/or closing of the master valve.

Another object of the invention is to provide a fluid flow regulating apparatus which operates with minimal losses in control fluid.

A further object of the invention is to provide a fluid flow regulating apparatus with novel and improved pilot and master valves and other fluid flow coontrolling devices.

An additional object of the invention is to provide a novel and improved valve assembly for use in the above outlined fluid flow regulating apparatus.

The fluid flow regulating apparatus of the present invention comprises a master valve, a pilot valve and at least one flow restrictor. The master valve has a body which is provided with a fluid admitting inlet opening and a fluiid discharging outlet opening, a valve member which is movable in the body between a plurality of positions to thereby change the rate of fluid flow between the two openings, and means for biasing the valve member in a first direction. The pressure of fluid in one of the openings is variable and the valve member has a first surface which is subjected to fluid pressure in the one opening so that the fluid in the one opening tends to move the valve member in a second direction counter to the first direction. The biasing means includes a plenum chamber which is defined by the body and valve member, and the latter has a second surface which is subject to the pressure of fluid in the plenum chamber.

The pilot valve is installed in a channel which connects the plenum chamber with the other of the two openings in the body of the master valve, and the flow restrictor is installed in a channel which connects the one opening with the plenum chamber. A ball or other suitable adjusting means is provided to adjust the pilot valve in response to adjustment of the flow restrictor or vice versa.

The novel features which are considered as characteristic of the invention are set forth in particular in the appended claims. The improved apparatus itself, however, both as to its onstruction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
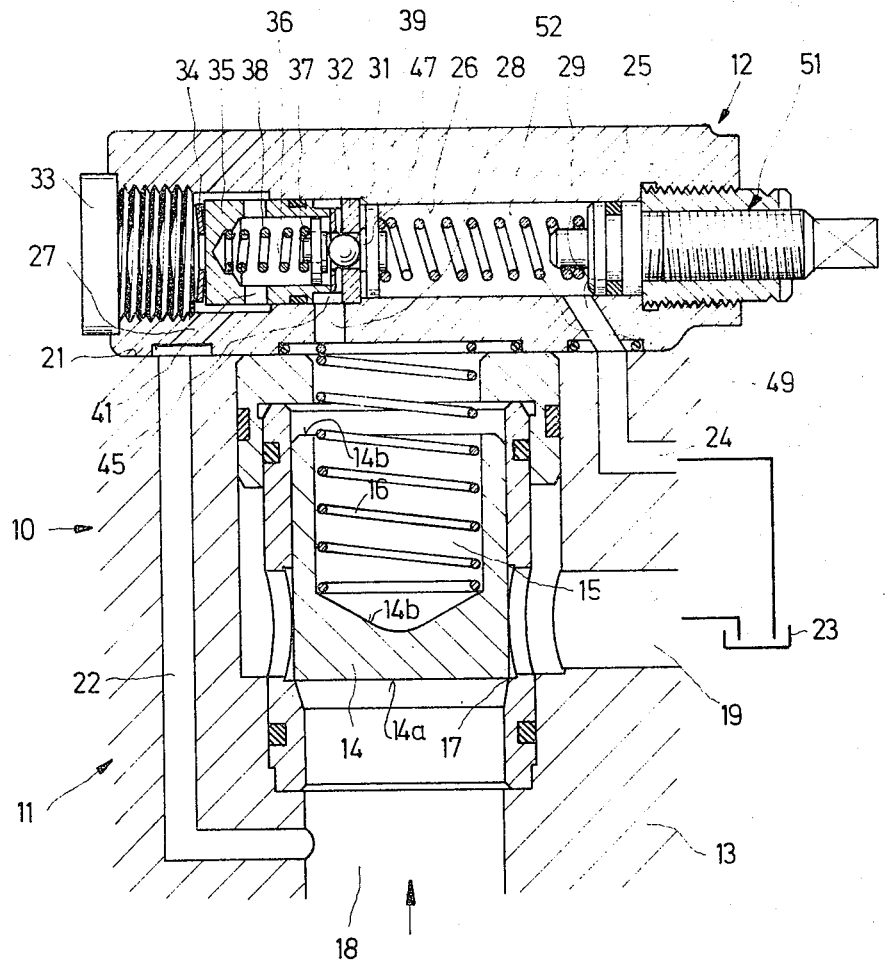
FIG. 1 is a partly diagrammatic longitudinal sectional view of a fluid flow regulating apparatus which embodies one form of the invention.
Figure 2:
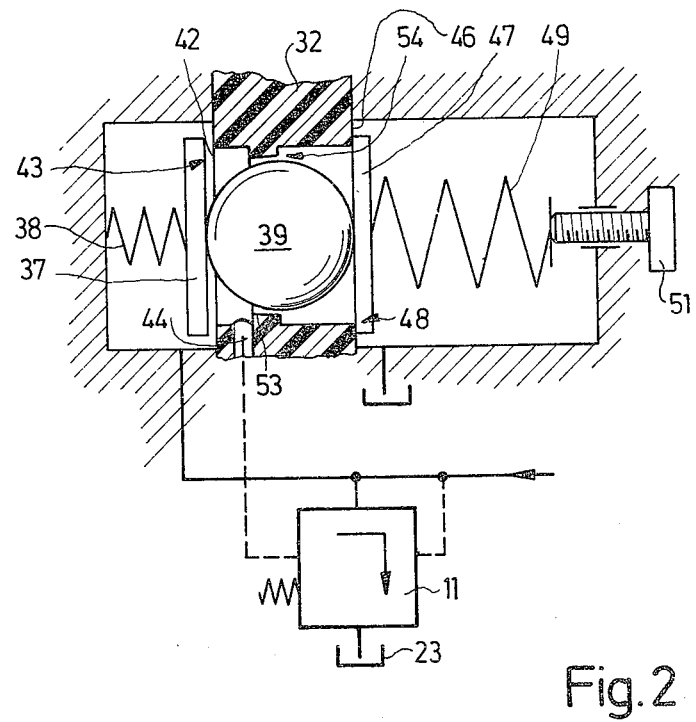
FIG. 2 is an enlarged view of a detail in the apparatus of FIG. 1.

The fluid flow regulating apparatus 10 of FIGS. 1 and 2 comprises a master or main valve 11 and an assembly 12 which includes a pilot valve 48 for the master valve 11. The master valve 11 has a housing or body 13 for a reciprocable valve member 14 which is disposed between a fluid admitting inlet opening 18 and a fluid discharging outlet opening 19 of the body 13. The pressure of fluid in the inlet opening 18 varies, and such fluid acts on a first surface 14a of the valve member 14 so as to urge the valve member 14 upwardly and away from a seat 17. When the valve member 14 engages the seat 17, the inlet opening 18 is sealed from the outlet opening 19 which latter serves to convey spent fluid to a tank or reservoir 23.

The valve member 14 defines with the body 13 a plenum chamber 15 and has a second surface 14b which is subjected to the pressure of fluid in the chamber 15 whereby such fluid urges the valve member 14 toward the seat 17. The supply of fluid in the plenum chamber 15 constitutes one part of a biasing means which further includes a helical valve spring 16 installed in the chamber 15 and tending to maintain the valve member 14 in sealing engagement with the seat 17. It will be noted that fluid which acts on the surface 14a tends to move the valve member 14 in a first direction and that fluid acting on the second surface 14b tends to move the valve member 14 in a second direction counter to the first direction. The pressure of fluid which acts on the surface 14b is assisted by the spring 16.

The body 13 is further formed with a first bore 22 which communicates with the inlet oening 18 and terminates at a surface 21 of the body 13. A second bore 24 of the body 13 extends from the surface 21 and serves to discharge fluid into the tank 23. Thus, the bore 24 can be said to communicate with the outlet opening 19 via tank 23.

The surface 21 of the body 13 abuts against a complementary surface provided on the housing or body 25 of the assembly 12. The housing 25 has a longitudinally extending bore 26 having portions of different diameters and communicating with three substantially radially extending ports 27, 28, 29 of the housing 25. The port 27 is in permanent communication with the bore 22 of the body 13, the port 28 is in permanent communication with the plenum chamber 15, and the port 29 is in permanent communication with the bore 24 of the body 13. The ports 27–29 are spaced apart from each other, as considered in the axial direction of the bore 26.

The housing 25 has an internal annular shoulder 31 which serves as an abutment for a stationary annular member 32 (hereinafter called ring for short) which is biased against the shoulder 31 by a dished spring 34 reacting against an externally threaded sealing element or plug 33 which extends into a tapped end portion of the bore 26 in the housing 25. The spring 34 urges the ring 32 against the shoulder 31 through the medium of an elongated sleeve 35 in the bore 26. The internal compartment 36 of the sleeve 35 receives an axially movable disk 37 which forms part of an adjustable flow restrictor 43 and is biased against a ball 39 in the central aperture of the ring 32 by a helical spring 38 reacting against the closed left-hand end of the sleeve 35. The sleeve 35 is formed with one or more radial passages 41 which connect the compartment 36 with the port 27 and hence with the inlet opening 18 of the body 13. The adjustable flow restrictor 43 further includes an apertures seating surface 42 at one side of the ring 32 and regulates the flow of fluid from the bore 22 into the chamber 15 via ports 27 and 28. The ring 32 has one or more radial bores 44 which communicate with an annular space 45 defined by an internal groove of the housing 25. The space 45 is in co-munication with the port 28 and is located between the ring 32 and sleeve 35.

A second apertured seating surface 46 at the other side of the ring 32 can be engaged by the disk-shaped valve member 47 of the pilot valve 48. The valve member 47 is biased against the surface 46 by a helical valve spring 49, and the bias of this spring is adjustable by a screw 51 which meshes with the right-hand end portion of the housing 25. The spring 49 is installed in a relief chamber 52 forming part of the bore 26 and communicating with the port 29. When the valve member 47 engages the surface 46 of the ring 32 (pilot valve 48 closed), the ball 39 keeps the disk 37 out of contact with the surface 42. This ball 39 is movable in a smaller-diameter portion 53 of the central aperture in the ring 32 and forms with the latter a second adjustable flow restrictor 54. The flow restrictor 54 throttles the flow of fluid from the chamber 15, through the pilot valve 48 (when the latter is open) and into the relief chamber 52. The disk 37 and the valve member 47 are provided with peripheral recesses or notches (not shown) to allow for unimpeded flow of a stream of control fluid.

The ball 39 of the second flow restrictor 54 constitutes a means for adjusting the flow restrictor 43 in response to adjustment of the pilot valve 48 and vice versa. The diameter of the ball 39 exceeds the distance between the apertured seating surfaces 42, 46 of the ring 32, i.e., the disk 37 cannot engage the surface 42 when the valve member 47 engages the surface 46, or vice versa.

The throttling action of the flow restrictor 43 is minimal when the pilot valve 48 is closed and when the throttling action of the flow restrictor 54 reaches a maximum value. The relationship between the flow restrictors 43 and 54 is such that changes in the throttling action of flow restrictor 43 (in response to rightward or leftward movement of the ball 39) are much more pronounced than those in the throttling action of flow restrictor 54, and that the throttling action of the flow restrictor 43 increases when the throttling action of the flow restrictor 54 decreases, or vice versa.

The operation of the fluid flow regulating apparatus 10 is as follows:

In the position shown in FIGS. 1 and 2, the pilot valve 48 is closed because the fluid pressure in the composite channel including 22, 27, 41, 36, 44, 45, 28 (this composite channel connects the inlet opening with the plenum chamber 15 and contains the flow restrictor 43) is not sufficient to move the valve member 47 of the pilot valve 48 away from the surface 46 of the ring 32, i.e., the bias of the adjustable valve spring 49 prevails to maintain the pilot valve 48 in closed position. The fluid pressure in the inlet opening 18 equals the fluid pressure in the plenum chamber 15 and, therefore, the valve spring 16 is free to maintain the valve member 14 in sealing engagement with the seat 17 to prevent the flow of fluid from the inlet opening 18 to the outlet opening 19.

If the fluid pressure in the inlet opening 18 rises to a predetermined value which is necessary to move the valve member 47 of the pilot valve 48 away from the surface 46, the fluid is free to flow from the plenum chamber 15, through the flow restrictor 54 and valve 48, through the relief chamber 52 and port 29, and into the bore 24. It will be noted that the parts 28, 45, 44, 53, 52, 29, 24, 23 constitute a second composite channel which connects the plenum chamber 15 with the outlet opening 19 and contains the pilot valve 48. At the same time, the first composite channel allows fluid to flow from the inlet opening 19 into the plenum chamber 15. A state of equilibrium will develop when the stream of fluid flowing into the plenum chamber 15 equals the stream of fluid flowing into the tank 23. The magnitude of the stream flowing into the plenum chamber 15 depends primarily on the flow restrictor 43 whose throttling action is selected as a function of the bias of the valve spring 16 and the cross-sectional area of valve member 14. The ball 39 insures that the throttling action of the flow member 43 increases in response to opening of the pilot valve 48. This insures a rapid movement of the valve member 14 away from the seat 17 so that the inlet opening 18 communicates with the outlet opening 19. Furthermore, the ball 39 slightly reduces the throttling action of the flow restrictor 54 (such action decreases in response to increasing throttling action of the flow restrictor 43, and vice versa) while greatly increasing the throttling action of the flow restrictor 43 and effecting a rapid opening of the pilot valve 48. In other words, the throttling action of the flow restrictor 43 increases rapidly as soon as the fluid pressure in the inlet opening 18 reaches the maximum permissible value, the rate of fluid flow from the inlet opening 18 to the plenum chamber 15 decreases, and the rate of liquid flow from the chamber 15 into the tank 23 increases. As mentioned above, the rate of fluid flow through the flow restrictor 43 decreases much more rapidly than the rate of fluid flow through the flow restrictor 54 increases in response to a rightward movement of the ball 39, as viewed in FIG. 1 or 2. Therefore, the movement of the valve member 47 away from the surface 46 of the ring 32 is gradual only during the short initial stage of opening of the pilot valve 48 (i.e., while the valve 48 begins to open) and is much more rapid as the throttling action of the flow restrictor 54 decreases in response to movement of the disk 37 toward the surface 42.

If the fluid pressure in the inlet opening 18 thereupon drops below the maximum permissible pressure, the spring 16 is free to rapidly return the valve member 14 into sealing engagement with the seat 17. This is possible because the flow restrictor 43 is then fully open (and the pilot valve 48 is closed) so that the pressure of fluid in the chamber 15 increases very rapidly and assists the spring 16 in moving the valve member 14 back to the position of FIG. 1.

Figure 3:
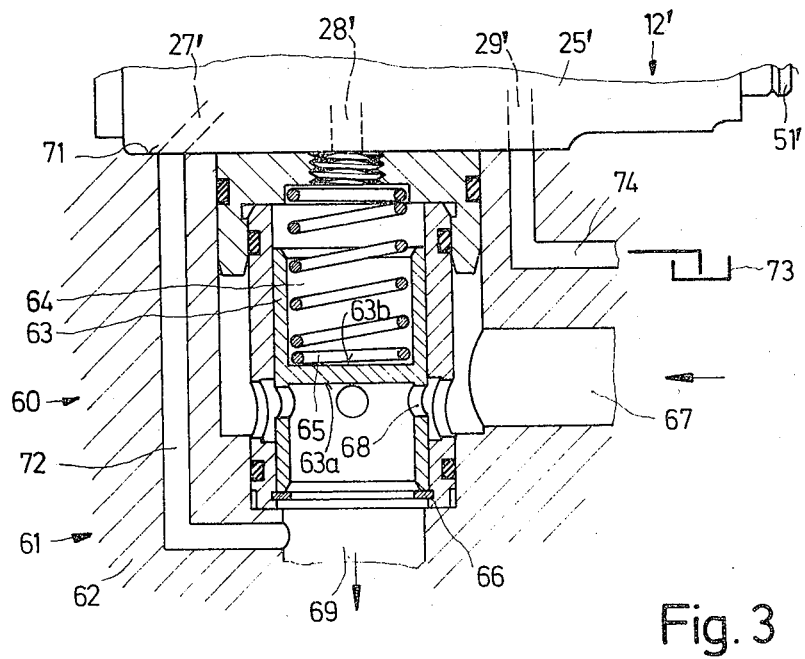
FIG. 3 is a fragmentary partly elevational and partly sectional view of a second fluid flow regulating apparatus.

FIG. 3 shows a portion of a second fluid flow regulating apparatus 60 wherein the assembly 12' is identical with or similar to the assembly 12 of FIGS. 1 and 2. The housing 25' of the assembly 12' abuts against a surface 71 of the body 62 of a master valve or main valve 61 having an inlet opening 67 and an outlet opening 69. In contrast to the operation of the master valve 11, the pressure of fluid in the outlet opening 69 should not exceed a predetermined maximum value and, therefore, the bore 72 in the body 62 connects the outlet opening 69 with the port 27' in the housing 25'. The port 29' of the housing 25' communicates with the tank 73 through the medium of a second bore 74 in the body 62. The fluid pressure in the inlet opening 67 need not be controlled.

The reciprocable valve member 63 in the body 62 is provided with openings 68 which allow fluid to flow from the inlet opening 67 to the outlet opening 69 in certain axial positions of the valve member 63. The rate of fluid flow between the openings 67, 69 reaches a maximum value when the valve member 63 abuts against an annular stop 66 in the body 62. The plenum chamber is shown at 64, the valve spring at 65, the first surface of the valve member 63 at 63a, and the second surface of the valve member 63 at 63b. When the valve member 63 moves away from the stop 66, the rate of fluid flow from the inlet opening 67 to the outlet opening 69 decreases while the bias of the spring 65 increases. The valve member 63 can be moved to a position in which the openings 67, 69 are completely sealed from each other. The port 28' of the housing 25' communicates with the plenum chamber 64.

The operation of the apparatus 60 is analogous to that of the apparatus 10. The main difference is that the pilot valve in the housing 25' opens when the pressure in the outlet opening 69 of the valve body 62 reaches a predetermined maximum valve. When the fluid pressure in the outelt 69 drops below the pressure which is selected by the adjusting means 51' for the spring of the pilot valve in the assembly 12', the valve member 63 moves downwardly and increases the rate of fluid flow from the inlet opening 67 into the outlet opening 69. Inversely, when the pressure of fluid in the outlet opening 69 rises, the valve member 63 moves upwardly and reduces the rate of fluid flow or terminates the flow of fluid from the inlet opening 67 into the outlet opening 69. In all other respects, the operation of the apparatus 60 is identical with that of the apparatus 10 of FIGS. 1 and 2.

An advantage of the improved fluid flow regulating apparatus is that the valve member 14 or 63 of the master valve 11 or 61 can react practically without delay to a rise or drop of fluid pressure in the opening 18 or 69 of the respective valve body. Moreover, the losses in control fluid (which flows between the opening 18, chamber 15 and opening 19 or opening 69, chamber 64 and opening 67) are minimal. Such losses are proportional to the speed at which the valve member of the master valve reacts to changes of fluid pressure in that opening which is connected with the plenum chamber by way of the flow restrictor 43. Losses in control fluid are further reduced due to the fact that the flow restrictor 54 reduces its throttling action during opening of the pilot valve 48 and that the ball 39 of the flow restrictor 54 simultaneously causes the flow restrictor 43 to reduce the rate of fluid flow into the plenum chamber.

Without further analysis, the foregoing will so fully reveal the gist of the present invention that others can, by applying current knowledge, readily adapt it for various applications without omitting features which fairly constitute essential characteristics of the generic and specific aspects of my contribution to the art, therefore, such adaptation should and are intended to be comprehended within the meaning and range of equivalence of the claims.

What is claimed as new and desired to be protected by letters patent is set forth in the appended claims.

What is claimed is:

1. In a fluid flow regulating apparatus, a combination comprising a master valve having a body provided with a fluid admitting inlet opening and a fluid discharging outlet opening, the pressure of fluid in one of said openings being variable, said master valve including further a valve member movable in said body between a plurality of positions to thereby change the rate of fluid flow between said openings and means for biasing said valve member in a first direction, said valve member having a first surface which is subjected to fluid pressure in said one opening so that the fluid in said one opening tends to move said valve member in a second direction counter said first direction, said biasing means including a plenum chamber and said valve member having a second surface which is subjected to the pressure of fluid in said chamber; first channel means connecting said one opening with said chamber; a tank; second channel means connecting said chamber with said tank; first adjustable flow restrictor means provided in said first channel means and comprising a portion which is movable between a plurality of positions to thereby change the rate of fluid flow in said first channel means; adjustable pilot valve means provided in said second channel means and comprising a portion which is movable between a plurality of positions including a closed position to thereby change the rate of fluid flow in said second channel means; and second flow restrictor means provided in said second channel means between said chamber and said pilot valve means, and comprising a first portion and a second portion movable with respect to said first portion to thereby change the rate of fluid flow through said second flow restrictor means, said second portion of said second flow restrictor mans being arranged to move said portion of said first flow restrictor means in response to movement of said portion of said pilot valve means and vice versa, said second flow restrictor means providing a maximum throttling action and said first flow restrictor means a minimum throttling action when said pilot valve means is in said closed position and said second portion of said second flow restrictor means being constructed and arranged to increase the throttling action of said first flow restrictor means at a first rate and simultaneously reduce the throttling action of said second flow restrictor means at a lower second rate when said pilot valve means moves away from said closed position in response to variations of fluid pressure in said one opening.

2. A combination as defined in claim 1, wherein said tank is connected to said outlet opening.

3. A combination as defined in claim 1, wherein said biasing means further comprises a spring which urges said vavle member in said first direction.

4. A combination as defined in claim 1, wherein said second portion increases the rate of fluid flow through said pilot valve and reduces the rate of fluid flow through said first mentioned flow restrictor means in response to increasing rate of fluid flow through said second flow restrictor means.

5. A combination as defined in claim 4, wherein said second portion of said second flow restrictor means is a ball and said first portion is an annular member having an aperture receiving said ball with a clearance which changes in response to movement of said ball relative to said annular member.

6. a combination as defined in claim 1, wherein said pilot valve comprises a first apertured seating surface and a first disk-shaped valve member which is movable toward and away from said first seating surface, first flow restrictor means comprising a second apertured seating surface and a second disk-shaped member which is movable toward and away from said second seating surface, said second portions being disposed between said disk-shaped members and being movable by one thereof to thereby effect the movement of the other disk-shaped member or vice versa, 7. A combination as defined in claim 6, further comprising a stationary annular member disposed between said disk-shaped members, said seating surfaces being provided at the opposite sides of said annular member.

8. A combination as defined in claim 1, wherein said one opening is said inlet opening.

9. A combination as defined in claim 1, wherein said one opening is said outlet opening.

* * * * *